(12) United States Patent
Hirosaki

(10) Patent No.: US 12,104,835 B2
(45) Date of Patent: Oct. 1, 2024

(54) REFRIGERATION CYCLE SYSTEM

(71) Applicant: Mitsubishi Electric Corporation, Tokyo (JP)

(72) Inventor: Hiroki Hirosaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 257 days.

(21) Appl. No.: 17/911,726

(22) PCT Filed: Aug. 31, 2020

(86) PCT No.: PCT/JP2020/032872
§ 371 (c)(1),
(2) Date: Sep. 15, 2022

(87) PCT Pub. No.: WO2022/044321
PCT Pub. Date: Mar. 3, 2022

(65) Prior Publication Data
US 2023/0111875 A1 Apr. 13, 2023

(51) Int. Cl.
*F25B 49/02* (2006.01)
(52) U.S. Cl.
CPC .......... *F25B 49/02* (2013.01); *F25B 2600/02* (2013.01); *F25B 2700/00* (2013.01)
(58) Field of Classification Search
CPC .... F25B 49/02; F25B 49/005; F25B 2600/02; F25B 2600/0251; F25B 2600/0253; F25B 2600/2513; F25B 2700/00; F25B 2700/151; Y02B 30/70
See application file for complete search history.

(56) References Cited

FOREIGN PATENT DOCUMENTS

| JP | 2005241089 A | * | 9/2005 | ............... F25B 49/02 |
| JP | 2007155226 A | * | 6/2007 | |
| JP | 2010-071603 A | | 4/2010 | |
| WO | WO-2005071332 A1 | * | 8/2005 | ............... F24F 11/30 |
| WO | WO-2017033240 A1 | * | 3/2017 | ............... F25B 49/02 |

OTHER PUBLICATIONS

International Search Report of the International Searching Authority mailed Oct. 27, 2020 in corresponding International Patent Application No. PCT/JP2020/032872 (with partial English translation).

* cited by examiner

*Primary Examiner* — Emmanuel E Duke
(74) *Attorney, Agent, or Firm* — Posz Law Group, PLC

(57) ABSTRACT

When the anomaly determination mode starts, the controller brings the decompressor into the first decompression amount state, and operates a compressor at a first speed. The controller is configured to store a value of the related physical quantity measured by the detector at a time point at which a first time elapses from a start of the anomaly determination mode, as a first measurement value, and thereafter switch the decompressor to the second decompression amount state from the first decompression amount state, store a value of the related physical quantity measured by the detector after the decompressor is switched to the second decompression amount state from the first decompression amount state, as a second measurement value, and determine that there is anomaly in the refrigerant circuit when a value obtained by subtracting the first measurement value from the second measurement value is larger than a first anomaly determination value.

5 Claims, 3 Drawing Sheets

REFRIGERATION CYCLE SYSTEM

CROSS REFERENCE TO RELATED APPLICATION

This application is a U.S. national stage application of PCT/JP2020/032872 filed on Aug. 31, 2020, the contents of which are incorporated herein by reference.

FIELD

The present disclosure relates to a refrigeration cycle system.

BACKGROUND

PTL 1 described below discloses a technique in which current value detection means for detecting the value of the current flowing in a compressor is provided, and the operation of the compressor is stopped when the current value that is detected by the current value detection means becomes a predetermined value or more within a predetermined time period after actuation of the compressor, as the technique for determining anomaly of the refrigerant circuit of a heat pump water heater.

CITATION LIST

Patent Literature

[PTL 1] JP 2010-071603 A

SUMMARY

Technical Problem

In the conventional system described above, the measurement values of a current change according to variation in characteristics due to individual differences in measuring instruments that measure the current, or differences in outside temperature, the other environmental conditions or the like. Therefore, it may not be possible to detect anomaly of a refrigerant circuit properly.

The present disclosure is made to solve the problem as described above, and has an object to provide a refrigeration cycle system that can properly detect anomaly of a refrigerant circuit.

Solution to Problem

A refrigeration cycle system according to the present disclosure includes: a refrigerant circuit including a compressor to compress a refrigerant, a cooler to cool the refrigerant compressed by the compressor, a decompressor to decompress the refrigerant that passes through the cooler, and an evaporator to evaporate the refrigerant that passes through the decompressor; a detector to measure a related physical quantity that is a physical quantity related to a state of the refrigerant circuit; and a controller to execute an anomaly determination mode to detect anomaly of the refrigerant circuit, when starting an operation of a refrigeration cycle by the refrigerant circuit. The decompressor can be switched between a first decompression amount state and a second decompression amount state, a decompression amount in the second decompression amount state being smaller than a decompression amount in the first decompression amount state. When the anomaly determination mode starts, the controller is configured to bring the decompressor into the first decompression amount state and operate the compressor at a first speed. The controller is configured to store a value of the related physical quantity that is measured by the detector at a time point at which a first time elapses from a start of the anomaly determination mode, as a first measurement value, and thereafter, switch the decompressor to the second decompression amount state from the first decompression amount state, store a value of the related physical quantity that is measured by the detector after the decompressor is switched to the second decompression amount state from the first decompression amount state, as a second measurement value, and determine that there is anomaly in the refrigerant circuit when a value obtained by subtracting the first measurement value from the second measurement value is larger than a first anomaly determination value, and stop an operation of the compressor.

Advantageous Effects of Invention

According to the present disclosure, it is possible to provide the refrigeration cycle system that can properly detect anomaly of the refrigerant circuit.

DESCRIPTION OF EMBODIMENTS

Hereinafter, embodiments are described with reference to the drawings. Common or corresponding elements in each of the drawings are assigned with the same reference signs, and explanation is simplified or omitted.

Embodiment 1

Figure 1:
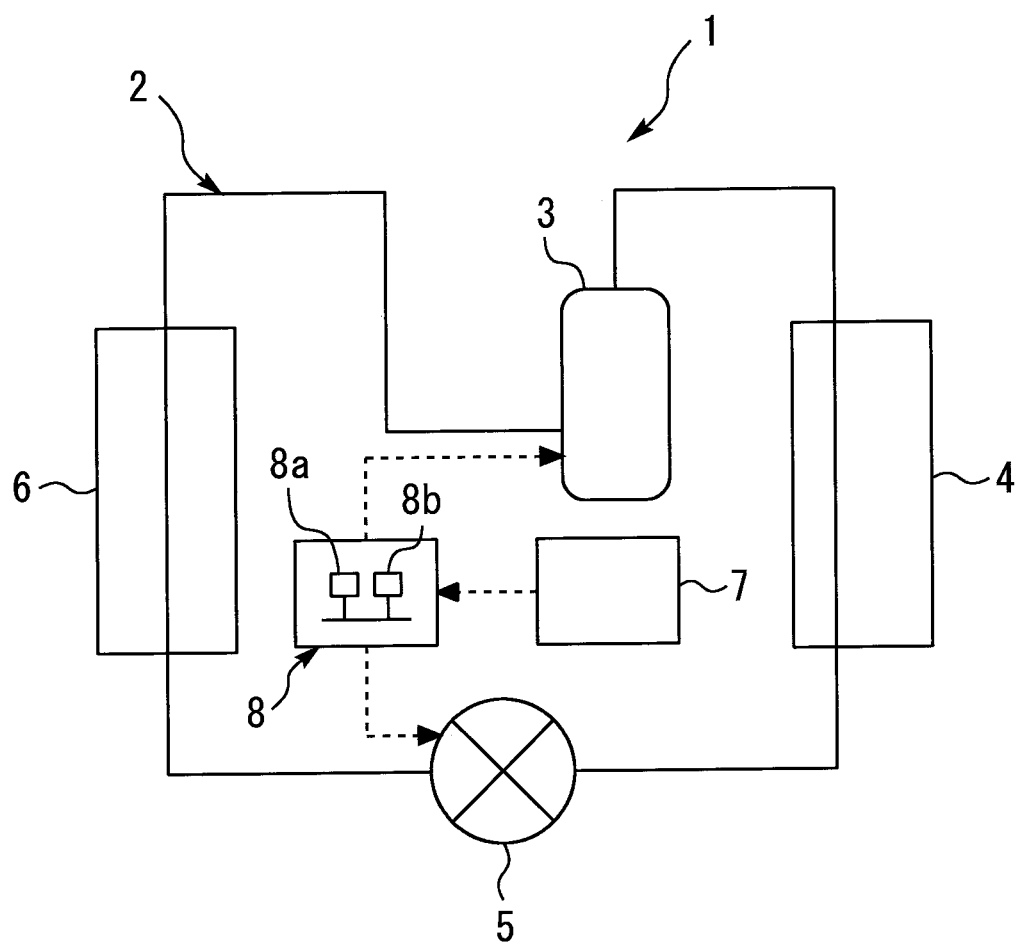
FIG. 1 is a diagram showing a refrigeration cycle system according to embodiment 1.

FIG. 1 is a diagram showing a refrigeration cycle system according to embodiment 1. As shown in FIG. 1, a refrigeration cycle system 1 includes a refrigerant circuit 2, a measurement unit 7, and a controller 8. The refrigerant circuit 2 includes a compressor 3 that compresses a refrigerant, a cooler 4 that cools a high-pressure refrigerant compressed by the compressor 3, a decompressor 5 that decompresses the high-pressure refrigerant that passes through the cooler 4, and an evaporator 6 that evaporates a low-pressure refrigerant decompressed by the decompressor 5. The compressor 3, the cooler 4, the decompressor 5, and the evaporator 6 form an annular circuit by being connected via refrigerant piping. Low-pressure refrigerant gas that flows out from the evaporator 6 is sucked by the compressor 3 and circulates in the refrigerant circuit 2 again. The refrigerant circuit 2 is operated by electric power.

A refrigerant to be sealed into the refrigerant circuit 2 is not particularly limited, and may be any one of carbon dioxide, ammonia, propane, isobutane, fluorocarbons such as HFC, HFO-1123, and HFO-1234yf, for example.

The cooler 4 corresponds to a heat exchanger that exchanges heat between a high-pressure refrigerant discharged from the compressor 3, and a first fluid having a lower temperature than the high-pressure refrigerant. In the cooler 4, the first fluid rises in temperature by being heated by the high-pressure refrigerant. The first fluid may be a liquid such as water or other liquid heat media, or gas such as indoor or outdoor air, for example. The refrigeration cycle system 1 may include, for example, a first fluid actuator (not illustrated) such as a pump or a blower for passing the first fluid to the cooler 4.

The decompressor 5 expands the high-pressure refrigerant to a low-pressure refrigerant. The decompressor 5 may be an expansion valve that can adjust an opening degree of a refrigerant passage. The low-pressure refrigerant that passes through the decompressor 5 is brought into a gas-liquid two-phase state.

The evaporator 6 corresponds a heat exchanger that exchanges heat between the low-pressure refrigerant decompressed by the decompressor 5, and a second fluid having a higher temperature than the low-pressure refrigerant. The refrigerant in the evaporator 6 evaporates by absorbing heat of the second fluid. The second fluid may be gas such as outdoor or indoor air, or a liquid such as water or other liquid heat media, for example. The refrigeration cycle system 1 may include a second fluid actuator (not illustrated) such as a blower or a pump, for example, to pass the second fluid to the evaporator 6.

The refrigeration cycle system 1 may be used for a purpose of heating the first fluid by the cooler 4, or may be used for a purpose of cooling the second fluid by the evaporator 6. For example, the refrigeration cycle system 1 may be used in at least one of a heat pump water heating system, a heat pump heating system, and an air-conditioning system.

A physical quantity related to a state of the refrigerant circuit 2 is referred to as a "related physical quantity" hereinafter. The measurement unit 7 corresponds to detector for measuring a related physical quantity. The measurement unit 7 in the present embodiment measures a compressor current that is a current that drives an electric motor included by the compressor 3 as the related physical quantity. The compressor current is correlated with a drive load of the compressor 3. As the pressure at a high pressure side of the refrigerant circuit 2 becomes higher, the drive load of the compressor 3 tends to be higher, and the compressor current also tends to be higher. Accordingly, by using the compressor current as the related physical quantity, it becomes possible to determine the state of the refrigerant circuit 2 properly.

The measurement unit 7 may measure a current that drives only the compressor 3 as the compressor current, or may measure a current that drives the compressor 3 and other devices (for example, a first fluid actuator, and a second fluid actuator) as the compressor current. A current that drives the other devices is smaller as compared with the current that drives the compressor 3, and therefore can be virtually ignored. In the case of an alternating current, the measurement unit 7 may measure an effective value of the current as the compressor current.

The controller 8 corresponds to control means for controlling an operation of the refrigeration cycle system 1. Each actuator and each sensor included by the refrigeration cycle system 1 are electrically connected to the controller 8. The controller 8 has a timer function to manage time. The controller 8 may be communicable with a user interface device (not illustrated).

Each function of the controller 8 may be achieved by a processing circuit. The processing circuit of the controller 8 may include at least one processor 8a and at least one memory 8b. At least the one processor 8a may realize each of functions of the controller 8 by reading and executing a program stored in at least the one memory 8b. Respective processing circuits of the controller 8 may include at least one exclusive hardware. The controller is not limited to a configuration in which an operation is controlled by the single controller 8 as in the illustrated example, but may have a configuration in which a plurality of control devices control the operation by cooperating with one another.

The controller 8 controls operations of the compressor 3 and the decompressor 5. The controller 8 may perform control so that an operation speed of the compressor 3 becomes variable by inverter control, for example. Further, the controller 8 may perform control so that an operation speed of at least one of the first fluid actuator and the second fluid actuator becomes variable by inverter control, for example.

The decompressor 5 can be switched between a first decompression amount state and a second decompression amount state in which a decompression amount is smaller than that of the first decompression amount state. The first decompression amount state corresponds to a state in which an opening degree of the decompressor 5 is small, for example. The second decompression amount state corresponds to a state in which the opening degree of the decompressor 5 is large, for example.

The controller 8 can execute a normal operation mode for performing a refrigeration cycle operation by the refrigerant circuit 2. At a time of the normal operation mode, the following may be performed. The controller 8 may control the operation speed of the compressor 3 according to a heating capacity or cooling capacity to be a target. The controller 8 may adjust the opening degree of the decompressor 5 according to a temperature or pressure of the refrigerant that is discharged from the compressor 3. The controller 8 may control an operation speed of the first fluid actuator according to at least one of a temperature of the first fluid that flows into the cooler 4 and a temperature of the first fluid that flows out from the cooler 4. The controller 8 may control an operation speed of the second fluid actuator according to at least one of a temperature of the second fluid that flows into the evaporator 6, and a temperature of the second fluid that flows out from the evaporator 6.

The controller 8 executes an anomaly determination mode to detect anomaly of the refrigerant circuit 2 when starting an operation of a refrigeration cycle. In the anomaly determination mode, the controller 8 operates the compressor 3 at a predetermined first speed. By keeping the operation speed of the compressor 3 constant, it is possible to detect anomaly of the refrigerant circuit 2 more properly. Further, in the anomaly determination mode, the controller 8 desirably keeps the operation speed of the first fluid actuator at a predetermined constant speed or stops the first fluid actuator, and desirably keeps the operation speed of the second fluid actuator at a predetermined constant speed or stops the second fluid actuator. By doing as above, it is possible to detect anomaly of the refrigerant circuit 2 more properly.

Figure 2:
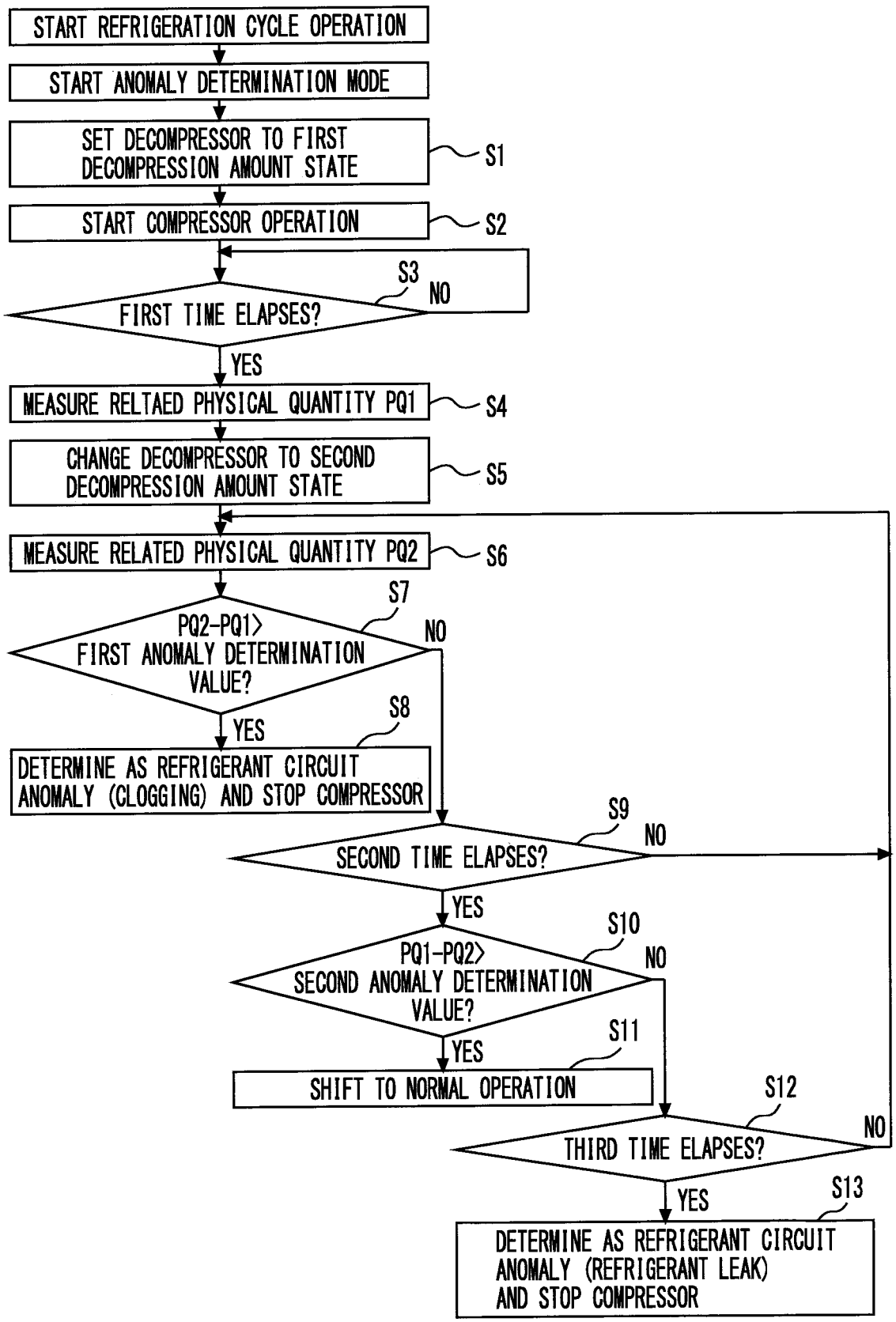
FIG. 2 is a flowchart showing an example of processes executed by a controller in an anomaly determination mode.
Figure 3:
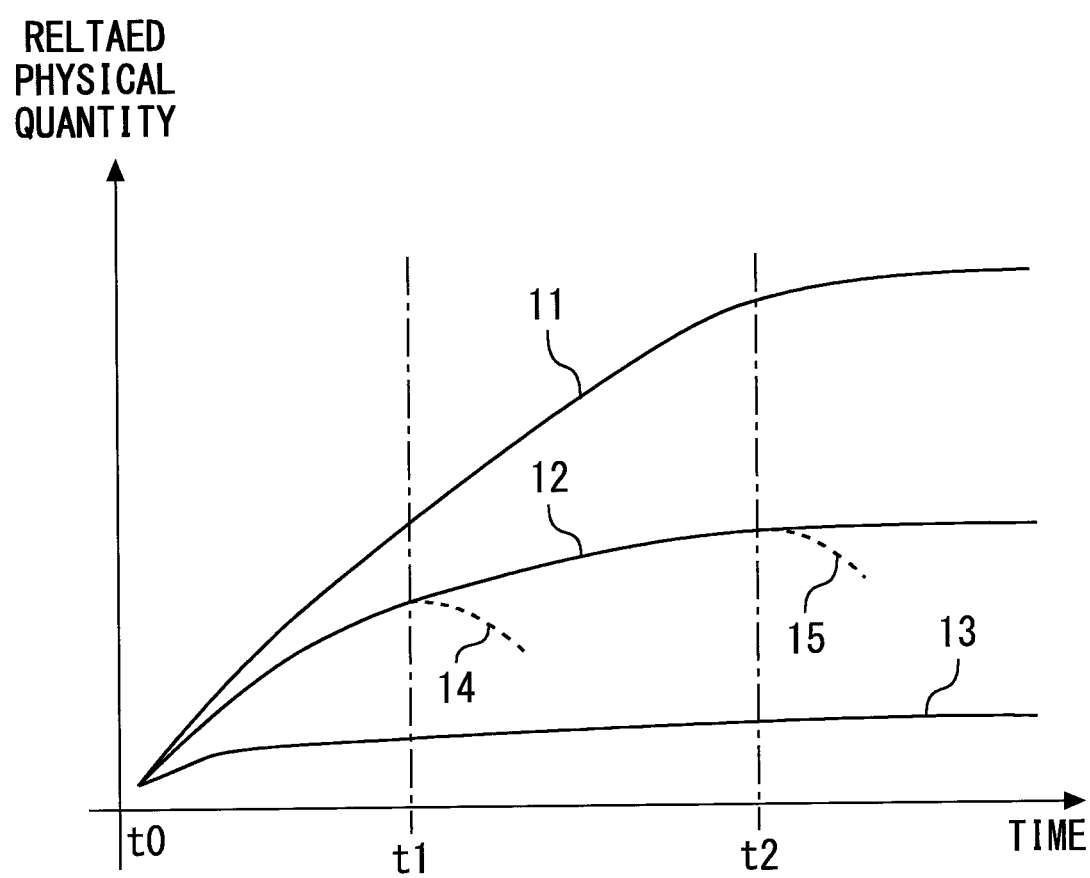
FIG. 3 is a diagram showing an example of a graph of a secular change of a related physical quantity after actuation of the compressor.

FIG. 2 is a flowchart showing an example of processes executed by the controller 8 in the anomaly determination mode. FIG. 3 is a diagram showing an example of a graph of a secular change of the related physical quantity after actuation of the compressor 3. In the present embodiment, the secular change of the related physical quantity shown in FIG. 3 corresponds to a secular change of the compressor current. In FIG. 3, the anomaly determination mode starts at a time t0. A time point at which the operation of the compressor 3 is started can be regarded as a time point at which the anomaly determination mode is started. In FIG. 3, a solid line 11 is a graph in the case in which the refrigerant circuit 2 is closed, a solid line 12 is a graph in the case in which the refrigerant circuit 2 is normal, and a solid line 13 shows a graph in the case in which the refrigerant in the refrigerant circuit 2 leaks and comes out.

As shown in FIG. 2, the controller 8 starts the anomaly determination mode first when starting the operation of the refrigeration cycle. When the anomaly determination mode starts, the controller 8 sets the decompressor 5 to the first decompression amount state (step S1). Next, the controller 8 actuates the compressor 3, and operates the compressor 3 at a first speed (step S2). Subsequently, the controller 8 determines whether a first time elapses from the start of the anomaly determination mode (step S3), and measures the related physical quantity by the measurement unit 7 when the first time elapses from the start of the anomaly determination mode (step S4). The controller 8 stores a value of the measured related physical quantity as a first measurement value PQ1. Thereafter, the controller 8 switches the decompressor 5 to the second decompression amount state from the first decompression amount state (step S5).

The controller 8 measures the related physical quantity by the measurement unit 7 after the decompressor 5 is switched to the second decompression amount state from the first decompression amount state (step S6). The controller 8 stores a value of the measured related physical amount as a second measurement value PQ2. The controller 8 compares a value obtained by subtracting the first measurement value PQ1 from the second measurement value PQ2 with a first anomaly determination value (step S7). When the value obtained by subtracting the first measurement value PQ1 from the second measurement value PQ2 is larger than the first anomaly determination value, the controller 8 determines that there is anomaly in the refrigerant circuit 2, and stops the operation of the compressor 3 (step S8).

As shown in FIG. 3, when the refrigerant circuit 2 is normal, the value of the related physical quantity rises as shown by the solid line 12 after start of the anomaly determination mode. The first time is set to be a shorter time than a time required until the value of the related physical quantity is stabilized when the second refrigerant circuit 2 is normal. For example, a time t1 in FIG. 3 may correspond to the first time. When the refrigerant circuit 2 is normal, a value of the related physical quantity of the solid line 12 is in the middle of increasing, at a time point of the time t1 at which the first time elapses from the start of the anomaly determination mode. When the refrigerant circuit 2 is normal, increase of the value of the related physical quantity of the solid line 12 approaches an end, at a time point of a time t2 in FIG. 3.

A broken line 14 in FIG. 3 is a graph in the case of the decompressor 5 being switched to the second decompression amount state from the first decompression amount state at the time t1 when the refrigerant circuit 2 is normal. Further, a broken line 15 in FIG. 3 is a graph in the case of the decompressor 5 being switched to the second decompression amount state from the first decompression amount state at the time t2, when the refrigerant circuit 2 is normal. When the refrigerant circuit 2 is normal, the load of the compressor 3 decreases when the decompressor 5 is switched to the second decompression amount state from the first decompression amount state, and therefore, the value of the compressor current that is the related physical quantity reduces, as shown by the broken line 14 or the broken line 15. Accordingly, when the refrigerant circuit 2 is normal, the second measurement value PQ2 becomes smaller than the first measurement value PQ1.

In contrast to this, when the refrigerant circuit 2 has a clogging somewhere and is blocked, the refrigerant that is downstream of the compressor 3 stagnates even after the decompressor 5 is switched to the second decompression amount state from the first decompression amount state at the time t1, so that the load of the compressor 3 continues to increase. As a result, the value of the compressor current that is the related physical quantity continues to increase. Therefore, in this case, the second measurement value PQ2 becomes larger than the first measurement value PQ1. Accordingly, when the value obtained by subtracting the first measurement value PQ1 from the second measurement value PQ2 is larger than the first anomaly determination value, it is considered that the refrigerant circuit 2 is blocked. According to the present embodiment, the controller 8 determines that there is anomaly in the refrigerant circuit 2 in this case and stops the operation of the compressor 3, whereby the controller 8 can reliably protect the refrigerant circuit 2.

In general, there is variation in characteristics due to individual differences, in measuring instruments that measure physical quantities. Accordingly, there is some error in the value of the related physical quantity measured by the measurement unit 7. Further, the value of the related physical quantity changes according to an outside air temperature and the other environmental conditions. If the measurement value itself of the related physical quantity is compared with the anomaly determination value, there is a possibility of erroneous determination due to an influence of variation in the measurement value due to the above-described factors. In contrast to this, according to the present embodiment, variation included in the first measurement value PQ1 and variation included in the second measurement value PQ2 are offset by comparing the value obtained by subtracting the first measurement value PQ1 from the second measurement value PQ2 with the first anomaly determination value. Therefore, according to the present embodiment, determination is hardly affected by the variation in the measurement value, so that erroneous determination can be reliably prevented.

Further, according to the present embodiment, the controller 8 can detect blockage of the refrigerant circuit 2, at a time point before the value of the related physical quantity is stabilized, after start of the anomaly determination mode. Therefore, the anomaly determination mode can be ended in a short time.

When a configuration that detects anomaly of the refrigerant circuit 2 after waiting for stabilization of the value of the related physical quantity, unlike the present embodiment, is assumed, a long time is required until determination of anomaly. With the configuration like this, anomaly determination cannot be performed at the time of the normal operation, and it is necessary to provide an exclusive mode. In the configuration like this, determination of anomaly is possible only when there is a suspicion of anomaly, and an anomaly diagnosis of the refrigerant circuit 2 cannot be performed routinely. In contrast to this, according to the present embodiment, the anomaly determination mode can be ended in a short time, and therefore it becomes possible to perform an anomaly diagnosis of the refrigerant circuit 2 routinely.

According to the refrigeration cycle system 1 of the present embodiment, it is possible to obtain the effect as described above by the processes of the anomaly determination mode described thus far. However, in the present disclosure, the controller 8 may be configured to further execute at least some of respective processes described below.

When the value obtained by subtracting the first measurement value PQ1 from the second measurement value PQ2 is the first anomaly determination value or less in step S7 in FIG. 2, the controller 8 proceeds to step S9, and determines whether a second time elapses from the start of the anomaly determination mode. The second time is a longer time than the first time. When the second time does not elapse yet from the start of the anomaly determination mode in step S9, the controller 8 executes the processes in and after step S6 again. In other words, the controller 8 measures the related physical quantity again by the measurement unit 7 in step S6, and stores the remeasurement value as the second measurement value PQ2. In other words, the controller 8 updates the second measurement value PQ2. Next, the controller 8 compares the value obtained by subtracting the first measurement value PQ1 from the updated second measurement value PQ2 with the first anomaly determination value again in step 7. When the value obtained by subtracting the first measurement value PQ1 from the second measurement value PQ2 is larger than the first anomaly determination value as a result, the controller 8 determines that there is anomaly in the refrigerant circuit 2, and stops the operation of the compressor 3. In this way, when the controller 8 is configured to be able to execute processes in step S6 and step S7 repeatedly, blockage of the refrigerant circuit 2 can be detected more reliably.

When the second time already elapses after the start of the anomaly determination mode in step S9, the controller 8 proceeds to step S10, and compares the value obtained by subtracting the second measurement value PQ2 from the first measurement value PQ1 with a second anomaly determination value. As described above, when the refrigerant circuit 2 is normal, the second measurement value PQ2 is smaller than the first measurement value PQ1. Accordingly, when the value obtained by subtracting the second measurement value PQ2 from the first measurement value PQ1 is larger than the second anomaly determination value, it is considered that the refrigerant circuit 2 is normal. Therefore, when the value obtained by subtracting the second measurement value PQ2 from the first measurement value PQ1 is larger than the second anomaly determination value in step S10, the controller 8 proceeds to step S11, ends the anomaly determination mode and starts the normal operation mode. In this way, when the controller 8 is configured to compare the value obtained by subtracting the second measurement value PQ2 from the first measurement value PQ1 with the second anomaly determination value, it becomes possible to start the normal operation mode earlier.

When the value obtained by subtracting the second measurement value PQ2 from the first measurement value PQ1 is the second anomaly determination value or less in step S10, the controller 8 proceeds to step S12, and determines whether a third time elapses from the start of the anomaly determination mode. The third time is a longer time than the second time. For example, the time t2 in FIG. 3 may correspond to the third time. When the third time does not elapse from the start of the anomaly determination mode yet in step S12, the controller 8 repeats the processes in and after step S6. When the third time already elapses from the start of the anomaly determination mode in step S12, the controller 8 proceeds to step S13, determines that there is anomaly in the refrigerant circuit 2, and stops the operation of the compressor 3.

When the refrigerant in the refrigerant circuit 2 leaks and comes out, the load of the compressor 3 is low, and therefore, the value of the related physical quantity becomes small as compared with the case in which the refrigerant circuit 2 is normal, as shown by the solid line 13 in FIG. 3. When the refrigerant circuit 2 is normal, the value of the related physical quantity reduces as shown by the broken line 15 when the decompressor 5 is switched to the second decompression amount state from the first decompression amount state at the time t2 in FIG. 3. In contrast to this, when the refrigerant in the refrigerant circuit 2 comes out, the load of the compressor 3 does not change even when the decompressor 5 is switched to the second decompression amount state from the first decompression amount state, and therefore, the value of the related physical quantity does not change, either. Therefore, when the refrigerant in the refrigerant circuit 2 comes out, a difference between the first measurement value PQ1 and the second measurement value PQ2 is small, and therefore, the value obtained by subtracting the second measurement value PQ2 from the first measurement value PQ1 is the second anomaly determination value or less in step S10. When at this time, the third time elapses from the start of the anomaly determination mode, the controller 8 proceeds to step S13, and confirms determination that the refrigerant in the refrigerant circuit 2 leaks and comes out. Thereby, the controller 8 can reliably detect that the refrigerant in the refrigerant circuit 2 leaks and comes out.

Embodiment 2

Next, embodiment 2 is described. A difference from embodiment 1 described above is mainly described, and explanation on the same parts or corresponding parts is simplified or omitted.

The present embodiment 2 differs from embodiment 1 in that embodiment 2 uses a compressor temperature as a related physical quantity instead of a compressor current. The compressor temperature is a temperature of a compressor 3. A measurement unit 7 in the present embodiment 2 measures the compressor temperature. The compressor temperature may be a temperature of a shell included by the compressor 3, for example. In the high-pressure shell type compressor 3, a high-pressure refrigerant before being discharged from the compressor 3 fills the inside of a shell. As pressure at a high-pressure side of a refrigerant circuit 2 is higher, a drive load of the compressor 3 tends to be higher. As the drive load of the compressor 3 is higher, the compressor temperature tends to be higher. Accordingly, it becomes possible to determine a state of the refrigerant circuit 2 properly by using the compressor temperature as the related physical quantity.

A secular change of the compressor temperature after actuation of the compressor 3 shows a similar tendency to that in the graph in FIG. 3. In the present embodiment 2, a controller 8 executes similar processes to those in embodiment 1 by using a value of the compressor temperature instead of the value of the compressor current in embodiment 1, and thereby a similar effect to that in embodiment 1 can be obtained.

Embodiment 3

Next, embodiment 3 is described. A difference from embodiment 1 described above is mainly described, and explanation on the same parts or corresponding parts is simplified or omitted.

The present embodiment 3 differs from embodiment 1 in that embodiment 3 uses a discharged refrigerant temperature as a related physical quantity instead of a compressor current. The discharged refrigerant temperature is a temperature of a refrigerant that is discharged from a compressor 3. A measurement unit 7 in embodiment 3 measures the discharged refrigerant temperature.

A secular change of the discharged refrigerant temperature after actuation of the compressor 3 shows a similar tendency to that in the graph in FIG. 3. In embodiment 3, a controller 8 executes similar processes to those in embodiment 1 by using a value of the discharged refrigerant temperature instead of the value of the compressor current in embodiment 1, and thereby a similar effect to that in embodiment 1 can be obtained.

REFERENCE SIGNS LIST

1 REFRIGERATION CYCLE SYSTEM
2 REFRIGERANT CIRCUIT
3 COMPRESSOR
4 COOLER
5 DECOMPRESSOR
6 EVAPORATOR
7 MEASUREMENT UNIT
8 CONTROLLER
8A PROCESSOR
8B MEMORY
11, 12, 13 SOLID LINE
14, 15 BROKEN LINE

The invention claimed is:

1. A refrigeration cycle system, comprising:
a refrigerant circuit including a compressor to compress a refrigerant, a cooler to cool the refrigerant compressed by the compressor, a decompressor to decompress the refrigerant that passes through the cooler, and an evaporator to evaporate the refrigerant that passes through the decompressor;
a detector to measure a related physical quantity that is a physical quantity related to a state of the refrigerant circuit; and
a controller to execute an anomaly determination mode to detect anomaly of the refrigerant circuit, when starting an operation of a refrigeration cycle by the refrigerant circuit,
wherein the decompressor can be switched between a first decompression amount state and a second decompression amount state, a decompression amount in the second decompression amount state being smaller than a decompression amount in the first decompression amount state,
when the anomaly determination mode starts, the controller is configured to bring the decompressor into the first decompression amount state and operate the compressor at a first speed,
the controller is configured to
store a value of the related physical quantity that is measured by the detector at a time point at which a first time elapses from a start of the anomaly determination mode, as a first measurement value, and thereafter, switch the decompressor to the second decompression amount state from the first decompression amount state,
store a value of the related physical quantity that is measured by the detector after the decompressor is switched to the second decompression amount state from the first decompression amount state, as a second measurement value, and
determine that there is anomaly in the refrigerant circuit when a value obtained by subtracting the first measurement value from the second measurement value is larger than a first anomaly determination value, and stop an operation of the compressor.

2. The refrigeration cycle system according to claim 1, wherein the
controller is configured to
determine whether a second time elapses from the start of the anomaly determination mode when the value obtained by subtracting the first measurement value from the second measurement value is the first anomaly determination value or less, the second time being a longer time than the first time,
measure the related physical quantity by the detector again when the second time does not elapse yet from the start of the anomaly determination mode, and update the second measurement value by the remeasurement value, and
compare a value obtained by subtracting the first measurement value from the second measurement value with the first anomaly determination value again, determine that there is anomaly in the refrigerant circuit when the value obtained by subtracting the first measurement value from the second measurement value is larger than the first anomaly determination value, and stop the operation of the compressor.

3. The refrigeration cycle system according to claim 2, wherein the controller is configured to
compare a value obtained by subtracting the second measurement value from the first measurement value with a second anomaly determination value, when the second time elapses from the start of the anomaly determination mode, and
end the anomaly determination mode and start a normal operation mode, when the value obtained by subtracting the second measurement value from the first measurement value is larger than the second anomaly determination value.

4. The refrigeration cycle system according to claim 3, wherein the controller is configured to
determine whether a third time elapses from the start of the anomaly determination mode, when the value obtained by subtracting the second measurement value from the first measurement value is the second anomaly determination value or less, the third time being a longer time than the second time, and
determine that there is anomaly in the refrigerant circuit when the third time elapses from the start of the anomaly determination mode, and stop the operation of the compressor.

5. The refrigeration cycle system according to claim 1, wherein the detector measures a current that drives the compressor as the related physical quantity.

* * * * *